May 3, 1932.  R. G. TAGLE ET AL  1,856,199
GAUGE
Filed Feb. 24, 1922
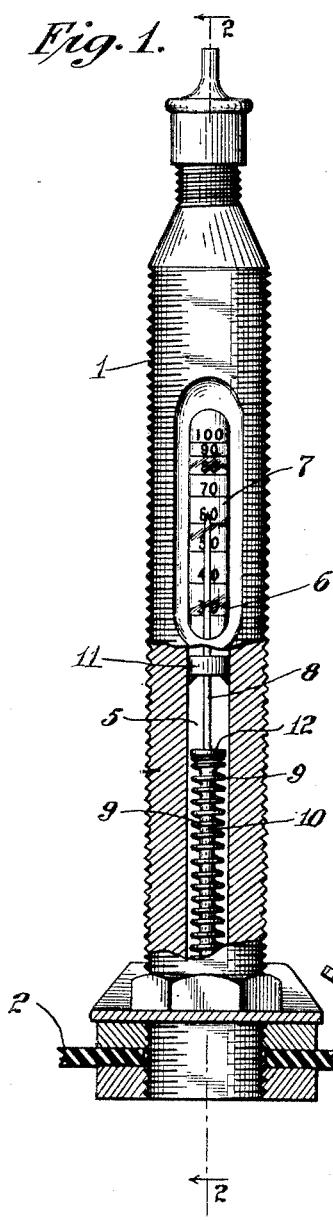
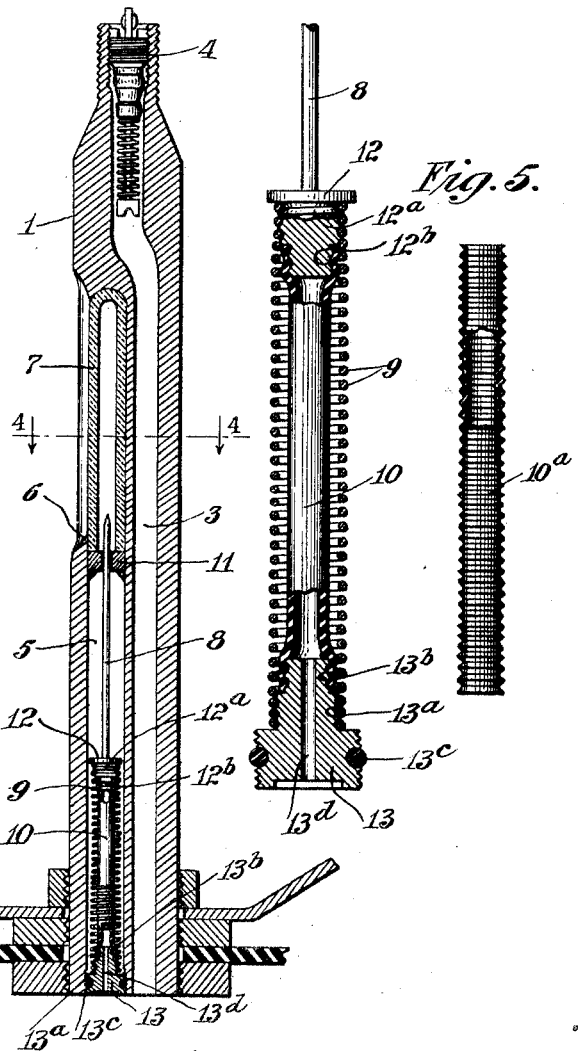
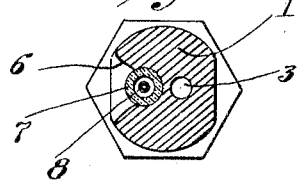

Patented May 3, 1932

1,856,199

UNITED STATES PATENT OFFICE

ROSCOE G. TAGLE, OF BROOKLYN, NEW YORK, AND EDWIN H. CURRIE, OF EAST ORANGE, NEW JERSEY, ASSIGNORS, BY MESNE ASSIGNMENTS, TO GEORGE J. WATSON, OF BROOKLYN, NEW YORK

GAUGE

Application filed February 24, 1922. Serial No. 538,868.

This invention is directed to an improved form of pneumatic gauge adapted more particularly for permanent attachment to the inner tube of an automobile tire with a tire valve preferably combined with the gauge. Many efforts have been made to produce a satisfactory device of this kind, but none have been entirely successful.

The present device is entirely free from the foregoing and other objections, being so constructed that the valve and indicator may function substantially independently of each other. To be more specific, in the present device, the valve casing is fixed or immovable and communicates directly with the interior of the tire through an independent air passage, while the pressure indicator as a distinct unit is located in a preferably separate chamber formed in the valve casing and having an opening through the side of the casing to render the indicator visible from the outside. This separate chamber of the valve casing is not only sealed against the entrance of dust or grit but is completely closed to the atmosphere, having merely an air passage through which the indicator may communicate with the interior of the tire. It can be seen therefore that, as the device is thus constructed, the pressure indicator is protected at all times from outside disturbances, and hence less liable to failure, but that, even in the event of failure of the indicator, no air can escape from the tire, due to the closed character of the separate chamber in which it is located, so that in such circumstances the device may still be used as a valve in the ordinary way. The exact construction and operation of the parts will be fully pointed out in the detailed description to follow.

Referring to the drawings:—

Fig. 1 is a front elevation of the improved device, partly broken away to show certain of the interior parts;

Fig. 2 is a longitudinal section taken on the line 2—2 of Fig. 1;

Fig. 3 is a detached view of the pressure tube and the actuating spring associated with the indicator;

Fig. 4 is a transverse section taken on the line 4—4 of Fig. 2, and

Fig. 5 illustrates a modified form of pressure tube.

In the drawings, the valve casing 1 is shown as permanently attached to a tire tube 2 in the customary way. The casing is exteriorly threaded, as usual; in fact it is of the standard type and hence usable with the regular tire equipment. Extending through the casing is an independent air passage 3 leading into the interior of the tire and containing at its inlet end a one-way valve 4 of the well known form. As shown in Fig. 2, just below the valve 4, the air passage 3 is offset from the central axis of the casing and extends down along the side thereof. This is done to provide ample room for a separate closed chamber and a contained pressure indicator. In the present embodiment, the closed chamber is constituted by a long cylindrical recess 5 starting from the base of the casing and terminating adjacent the point of offset of the air passage and which has an elongated opening 6 cut through the front side of the casing; while the pressure indicator comprises a transparent calibrated tube 7 (made of glass or other suitable material), a pointer 8 slidable upwardly and downwardly within the tube, a helical actuating spring 9, and an extensible pressure tube 10 surrounded by the spring. It will be noted that the indicator tube 7 is located in the upper portion of the recess 5 and has its calibrations showing through the side opening 6 of the casing. In practice, a thin coating of cement or other binding substance will be applied to the indicator tube in order to hold it in place and to insure a perfect air-tight fit around the opening 6. The tube is further held in place by a washer 11 having a central guiding opening for the sliding pointer rod 8. This pointer rod 8 is provided with a stepped base member 12 having a screw-threaded portion 12$^a$ onto which the upper end of the spring 9 is threaded and having a circumferentially grooved portion 12$^b$ to which the upper end of the pressure tube 10 is secured in an air-tight manner. At their lower ends, the spring 9 and pressure tube 10 are anchored to a stepped plug 13 screwed into the lower end of the recess 5 and having, like the member 12, a screw-threaded portion 13ᵃ and a ribbed portion 13ᵇ for the attachment of the spring and tube, respectively. The plug 13 is also provided (see Fig. 3) with a rubber gasket 13ᶜ seated in a groove in its outer face and forming an air-tight seal for the lower end of the recess 5. The indicator, although thus completely closed to the atmosphere, communicates with the interior of the tire through a supplemental air passage 13ᵈ extending centrally through the plug 13 and leading into the pressure tube 10. In Figs. 1 to 4, the pressure element 10 is shown in the form of a plain rubber tube capable of being extended by reason of its elasticity. In Fig. 5, however, it is shown alternatively in the form of a corrugated or accordion-like tube 10ᵃ which when extended will offer less resistance to the movement of the pointer rod 8. It is obvious that the calibrations might be placed on the movable instead of the stationary part of the indicator, as herein, but the arrangement shown is preferred because the calibrations may be more easily observed from the outside. In this connection, it may be noted that in practice the tube 7 will be silvered at the back so as to magnify the calibrations and render them more conspicuous.

The operation of the device will now be clear: In inflating the tire, the air is forced through the main air passage 3 directly into the interior of the tire and thence through the supplemental air passage 13ᵈ into the pressure tube 10, the valve 4 of course preventing any escape of the air back through the main passage 3. As the pressure increases, it presses upwardly on the base member 12 and lifts the pointer 8 against the combined action of the spring 9, the air confined in tube 5 and recess 7, and rubber tube 10, the latter being held against lateral expansion by the surrounding spring. Due to the transparency of the calibrated tube 7 and the presence of the opening 6 in the casing, the readings of the indicator may be readily seen from the outside and the pressure noted at any stage of the operation. After inflation, the device, being a permanent part of the tire, will naturally act at all times to indicate the exact pressure within the tire, the pointer rising or falling according as the pressure increases or diminishes. It is pointed out that the device is extremely simple and can be made at small cost and without involving any radical alteration in the standard tire equipment. In addition, the parts are strong, durable and compact and capable of being assembled with the least difficulty and delay. Thus, all of the movable parts of the indicator may be fitted together on the work bench and then inserted as a unit in the valve casing without any further manipulation. Once assembled, the indicator parts are completely enclosed within the valve casing and hence fully protected against the harmful effects of dust and grit or other foreign substances, so their operation is thoroughly reliable under all conditions of use. Moreover, even in the event of failure of the indicator, due for example to the rupture of the rubber pressure tube, no harm can result, as the air will simply flow into the closed chamber in which the indicator is located and thus be prevented from escaping to the atmosphere. The valve mechanism consequently remains intact and free to function independently as long as may be desired.

It will be appreciated that the invention, in its broader aspects, may be embodied in a variety of forms and carried out by the use of many different kinds of indicators. The broad feature of the invention in this respect is that the indicator or its movable parts are located within a chamber closed to the atmosphere for the reasons previously explained. Again, in providing for the connection of the indicator with the interior of the tire, it is not necessary that the supplemental air passage be located in the base of the valve casing, although this arrangement is preferred in that it permits the use of a more sensitive indicator than might otherwise be possible. These and various other changes and alterations will readily suggest themselves to those skilled in the art without departing from the spirit of the invention or sacrificing its chief advantages. It should be understood, therefore, that the invention is not limited to any specific form or embodiment except in so far as such limitations are specified in the claims.

Having thus described our invention, what we claim is as follows:

1. A gauge comprising a casing having one end adapted to be fitted to an inner tube, and having an interior continuous longitudinal recess open at the said end of the casing and having a longitudinal opening cut through the side of the casing at the upper end of the recess, a transparent member located within the recess and of a length substantially corresponding to that of said opening and adapted to be inserted endwise thereinto through the lower open end thereof, said transparent member presenting a side face contacting with the side wall of the recess entirely around the opening cut through the side of of the casing so as to form an air-tight seal around the inner edge of said openings, and a pressure indicator unit independent of the transparent member and located within the longitudinal recess and visible from the outside through the transparent member.

2. A gauge comprising a casing having one end adapted to be fitted to an inner tube, and having an interior continuous longitudinal recess open at the said end of the casing and having a longitudinal opening cut through the side of the casing at the upper end of the recess, a glass tube located within the recess and of a length substantially corresponding to that of said opening and adapted to be inserted endwise thereinto through the lower open end thereof, said tube having its outer side wall contacting snugly against the side wall of the recess entirely around the opening cut through the side of the casing so as to form an air-tight seal around the inner edge of said opening, and a pressure indicator unit independent of the glass tube and located within the longitudinal recess and visible from the outside through the glass tube.

3. A gauge, comprising a casing formed with a longitudinal recess and an elongated side opening located at one end thereof, a transparent element covering said opening and forming an air-tight seal therearound, a movable indicator located within the longitudinal recess in position to show through the side opening and having a stepped base member presenting at its lower side two cylindrical portions of different diameters, a stepped closing plug fitted air-tight in the lower end of the longitudinal recess and presenting at its upper side two cylindrical portions corresponding to those of the stepped base member, an extensible pressure tube attached at its opposite ends in an air-tight manner to the smaller cylindrical portions of the base member and closing plug, and a helical spring surrounding the pressure tube and attached at its opposite ends to the larger cylindrical portions of said base member and closing plug, the said closing plug being formed with an air passage extending therethrough.

4. A gauge comprising a casing having one end adapted to be fitted to an inner tube, and having an interior continuous longitudinal recess open at the said end of the casing and having a longitudinal opening cut through the side of the casing at the upper end of the recess and otherwise closed to the atmosphere, a transparent member located within the recess and of a length substantially corresponding to that of said opening and adapted to be inserted endwise thereinto through the lower open end thereof, said transparent member presenting a side face contacting with the side wall of the recess entirely around the opening cut through the side of the casing so as to form an air-tight seal around the inner edge of said opening, a movable indicator rod independent of the transparent element and supported within the closed recess in position to show through the side opening, and a tubular pressure element also located in said closed recess for actuating the indicator rod, the said tubular pressure element being closed at one end against communication with the containing recess and having an opning at the other end for the inlet of pressure-air.

5. A gauge, comprising a casing formed with a longitudinal recess and an elongated side opening located at one end thereof, a transparent element covering said opening, a movable indicator rod located within the longitudinal recess in position to show through the side opening, a stepped base member carrying the indicator rod and presenting at its lower side two cylindrical portions of different diameters, a stepped closing plug fitted air-tight in the lower end of the longitudinal recess and presenting at its upper side two cylindrical portions corresponding to those of the stepped base member, an extensible pressure tube attached at its opposite ends in an air-tight manner to the smaller cylindrical portions of the base member and closing plug, and a helical spring surrounding the pressure tube and attached at its opposite ends to the larger cylindrical portions of said base member and closing plug, the said closing plug being formed with an air passage extending therethrough.

6. A gauge, comprising a casing formed with a longitudinal recess and an elongated side opening located at one end thereof, a transparent element covering said opening, a movable indicator rod located within the longitudinal recess in position to show through the side opening, a washer fitted in the longitudinal recess below the side opening and formed with a guiding aperture through which the indicator rod passes, a stepped base member carrying the indicator rod and presenting at its lower side two cylindrical portions of different diameters, a stepped closing plug fitted air-tight in the lower end of the longitudinal recess and presenting at its upper side two cylindrical portions corresponding to those of the stepped base member, an extensible pressure tube attached at its opposite ends in an air-tight manner to the smaller cylindrical portions of the base member and closing plug, and a helical spring surrounding the pressure tube and attached at its opposite ends to the larger cylindrical portions of said base member and closing plug, the said closing plug being formed with an air passage extending therethrough.

7. A gauge comprising a casing having one end adapted to be fitted to an inner tube, and having an interior continuous longitudinal recess open at the said end of the casing and having a longitudinal opening cut through the side of the casing at the upper end of the recess, and otherwise closed to the atmosphere, a transparent member located within the recess and of a length substantially corresponding to that of said opening and adapted to be inserted endwise thereinto through the lower open end thereof, said transparent member presenting a side face contacting with the side wall of the recess entirely around the opening cut through the side of the casing so as to form an air-tight seal around the inner edge of said opening, a movable indicator rod supported within the closed recess in position to show through the side opening, and a tubular pressure element also located in said closed recess for actuating the indicator rod, the said tubular pressure element being closed at one end against communication with the containing recess and having an inlet at the other end for the pressure-air.

In testimony whereof, we have affixed our signatures hereto.

ROSCOE G. TAGLE.
EDWIN H. CURRIE.